Patented Nov. 14, 1933

1,935,209

UNITED STATES PATENT OFFICE 1,935,209

PRODUCTION OF AROMATIC AMINES FROM PHENOLS

Paul Herold, Neuroessen, and Friedrich Reubold, Merseburg, Germany, assignors to I. G. Farbenindustrie Aktiengesellschaft, Frankfort-on-the-Main, Germany No Drawing. Application December 24, 1930, Serial No. 504,646, and in Germany January 16, 1930

5 Claims. (Cl. 260—130.5)

The present invention relates to improvements in the production of aromatic amines from phenols.

It is already known that amines may be obtained by the conversion of gaseous ammonia and phenol vapours with the aid of dehydration catalysts at temperatures above 400° C. This reaction proceeds very incompletely, however, even when using a large excess of ammonia and a slow speed of flow. Moreover, large amounts of secondary amines and phenol ethers are formed as by-products in addition to the primary amines. Furthermore, since the catalysts employed rapidly suffer as regards their activity and finally almost entirely lose their catalytic activity, the said reaction cannot be used on an industrial scale.

We have now found that in the said reaction much better yields and more uniform products can be obtained by carrying out the conversion at increased pressures such as between 50 and 300, preferably between 100 and 300 atmospheres. Under these conditions, even when employing comparatively large throughputs, 90 per cent, when employing especially active catalysts even from 98 to 99 per cent, of the phenols employed are continually converted into the corresponding amines.

All the usual dehydration catalysts, either alone or in admixture or with carriers are suitable as catalysts. The best results are obtained with aluminium hydroxide as the catalyst. The catalysts retain their activity unchanged for long periods of time on working according to the present invention.

It is preferable to work at temperatures of about 450° C. and with a large excess of ammonia, because in this way a high yield is obtained on the one hand and the formation of the said by-products is strongly suppressed on the other hand. After the amines formed and the water formed during the reaction have been removed under pressure at a suitable temperature, the remainders of ammonia are preferably returned to the reaction chamber.

The said process renders it possible, inter alia, to prepare amine mixtures for the production of anti-knock additions for motor fuels from amines and iron carbonyl according to the application Ser. No. 433,172, filed March 3rd, 1930, the crude phenols boiling up to 230° C. contained in the crude benzines from the destructive hydrogenation products of coals, tars and the like or dissolved in the condenser or low temperature carbonization waters in the preparation of tars for hydrogenation processes being employed as initial materials. If desired the amines obtained may be alkylated as for example by methylation.

The following examples will further illustrate the nature of this invention, but the invention is not restricted to these examples. The parts are by volume.

Example 1

A mixture of 1 part of crude cresol and 3 parts of liquid, practically anhydrous, ammonia is sprayed into a pressure-tight tube lined with copper, heated to 450° C. and charged with aluminium hydroxide which has been rendered compact in a suitable manner, as for example by making into a paste, drying and heating with phosphoric acid or a strong solution of aluminium nitrate. The effluent vapours are condensed in such a manner that a pressure of 150 atmospheres is maintained in the reaction tube. The condensate obtained consists of an aqueous ammoniacal layer and an oily layer. The latter, after expelling dissolved water and ammonia, consists to the extent of 98 per cent of almost pure toluidine in addition to unchanged cresol.

Example 2

A pressure-tight tube similar to that employed in the foregoing example and provided with a vaporizer in front is charged with a catalyst consisting of equal parts by weight of aluminium hydroxide and kaolin. The temperature in the space of the catalyst is 450° C. A mixture of 1 part of crude cresol and 2 parts of liquid ammonia is sprayed at a pressure of 120 atmospheres into the vaporizer and a pressure of 120 atmospheres is maintained in the reaction tube by suitably releasing the pressure on the condensed reaction products. The toluidine formed contains only small amounts of unchanged cresol in addition to water.

Example 3

A crude benzine obtained by destructive hydrogenation of brown coal tar is subjected to a treatment with caustic soda solution for the purpose of purification. The phenols thus washed out are set free in a suitable manner, as for example by saturation with carbon dioxide, and separated off. The fraction of this crude phenol mixture which boils up to 230° C. is subjected to a treatment with ammonia in the vapour phase at elevated temperatures according to Example 1. The resulting crude mixture of amines, which consists mainly of primary amines, such as aniline, and toluidines and xylidines, as well as small amounts of the corresponding secondary amines, can, after drying and without special purification, be mixed with from 5 to 10 per cent by weight of the amines of iron carbonyl and if desired other substances and may be added directly to pure benzines and has an excellent anti-knock action. It is frequently advantageous to alkylate the primary amines before being used as anti-knocking agents, for example to replace one or both of the hydrogen atoms linked to nitrogen by a methyl radicle. The fraction boiling up to 230° C. of the crude phenols which may be extracted in the usual manner from aqueous by-products formed in the low temperature carbonization of hard coal, brown coal, or peat with the production of tars and from the aqueous by-products formed in the destructive hydrogenation of these tars, for the preparation of motor fuels, may be rendered useful in the same manner.

The phenols which both in the said aqueous by-products and crude synthetic benzines have hitherto been extremely troublesome and which had hitherto to be rendered in part non-injurious by costly methods and the recovery of which was comparatively worthless, may find useful employment according to this invention by conversion into amines and may thus be used as additions to the products in the preparation of which they are obtained.

*Example 4*

A mixture of 1 part of phenol and 2 parts of liquid ammonia is subjected to a heat-treatment under high pressure and in the presence of a catalyst as described in Example 2. The mixture is converted into aniline which in addition to some water contains only traces of phenol.

What we claim is:—
1. In the production of amines from vapours of a phenol of the benzene series and of ammonia while heating in the presence of a dehydration catalyst, the step which comprises carrying out the reaction at a pressure between 50 and 300 atmospheres.

2. In the production of amines from vapours of a phenol of the benzene series and of ammonia while heating to a temperature of from 400° to 450° C. in the presence of aluminium hydroxide, the step which comprises carrying out the reaction at a pressure between 50 and 300 atmospheres.

3. In the production of amines from vapours of a phenol of the benzene series and of ammonia while heating to a temperature of from 400° to 450° C. in the presence of a dehydration catalyst, the step which comprises carrying out the reaction at a pressure between 50 and 300 atmospheres.

4. In the production of amines from vapours of a phenol of the benzene series and of ammonia while heating to a temperature of from 400° to 450° C. in the presence of a dehydration catalyst, the step which comprises carrying out the reaction at a pressure between 50 and 300 atmospheres and with a quantity of ammonia exceeding that theoretically required.

5. In the production of amines from vapours of phenols of the benzene series and of ammonia while heating to a temperature of from 400° to 450° C. in the presence of a dehydration catalyst, the step which comprises carrying out the reaction at a pressure between 50 and 300 atmospheres and with the mixture of phenols of the benzene series obtained by the low temperature carbonization and destructive hydrogenation of carbonaceous materials.

PAUL HEROLD.
FRIEDRICH REUBOLD.